(12) United States Patent
Bouveret

(10) Patent No.: US 12,384,597 B2
(45) Date of Patent: Aug. 12, 2025

(54) CELLULOSE CONTAINER WITH INNER-MOLD LABEL

(71) Applicant: NORTH AMERICA I.M.L. CONTAINERS INC., St-Placide (CA)

(72) Inventor: Nicolas Bouveret, St-Placide (CA)

(73) Assignee: NORTH AMERICA I.M.L. CONTAINERS INC., St-Placide (CA)

( * ) Notice: Subject to any disclaimer, the term of this patent is extended or adjusted under 35 U.S.C. 154(b) by 76 days.

(21) Appl. No.: 17/943,673

(22) Filed: Sep. 13, 2022

(65) Prior Publication Data

US 2023/0092569 A1 Mar. 23, 2023

Related U.S. Application Data

(60) Provisional application No. 63/245,979, filed on Sep. 20, 2021.

(51) Int. Cl.
| | |
|---|---|
| *B65D 23/08* | (2006.01) |
| *B65D 1/10* | (2006.01) |
| *B65D 25/14* | (2006.01) |
| *G09F 3/02* | (2006.01) |
| *G09F 3/10* | (2006.01) |

(52) U.S. Cl.
CPC .......... *B65D 23/0864* (2013.01); *B65D 1/10* (2013.01); *B65D 25/14* (2013.01); *G09F 3/10* (2013.01); *G09F 2003/0233* (2013.01); *G09F 2003/025* (2013.01); *G09F 2003/0272* (2013.01)

(58) Field of Classification Search
CPC ....... G09F 2003/0272; G09F 2003/025; G09F 2003/0222; B65D 25/14; B65D 1/10; B65D 23/0864
USPC ..................... 206/459.5; 428/218, 36.5, 34.2
See application file for complete search history.

(56) References Cited

U.S. PATENT DOCUMENTS

| | | | | | |
|---|---|---|---|---|---|
| 4,961,811 | A | * | 10/1990 | Haugwitz | ............... G09F 15/02 |
| | | | | | 156/934 |
| 5,516,562 | A | * | 5/1996 | Edwards | .............. B65D 65/466 |
| | | | | | 428/76 |
| 9,856,608 | B1 | * | 1/2018 | Chung | ...................... D21J 7/00 |
| 2008/0061119 | A1 | | 3/2008 | Heyman | |
| 2015/0204020 | A1 | * | 7/2015 | Gordon | ..................... D21J 5/00 |
| | | | | | 162/109 |
| 2016/0122117 | A1 | | 5/2016 | Moore et al. | |
| 2021/0164171 | A1 | | 6/2021 | Kuiper | |

FOREIGN PATENT DOCUMENTS

| | | |
|---|---|---|
| CN | 203700877 U | 7/2014 |
| GB | 2588443 A | 4/2021 |
| JP | 2002201599 A | 7/2002 |
| JP | 4 599636 B2 | 12/2010 |

* cited by examiner

*Primary Examiner* — Chun Hoi Cheung
(74) *Attorney, Agent, or Firm* — NORTON ROSE FULBRIGHT CANADA LLP

(57) ABSTRACT

A container or lid may have a body of molded cellulose, the body of molded cellulose defining one or more walls. The wall has an outer surface and an inner surface. A depression is in the outer surface of the wall or walls. One or more labels, is or are embedded in the depression in the outer surface of the wall. A method for labelling a container or lid having a cellulose body may also be provided.

17 Claims, 2 Drawing Sheets

CELLULOSE CONTAINER WITH INNER-MOLD LABEL

CROSS-REFERENCE TO RELATED APPLICATION

The application relates claims the priority of U.S. Patent Application Ser. No. 63/245,979, filed on Sep. 20, 2021 and incorporated herein by reference.

TECHNICAL FIELD

The application relates to cellulose containers used in the packaging industry for products such as foodstuff, cosmetics, or objects or materials of various types. The cellulose may also be referred to as moulded (molded) pulp, fiber (fibre), thermoformed fiber (fibre).

BACKGROUND

Containers are traditionally used when packaging foodstuff in liquid or loose form, or for other objects, or materials. While plastics have been commonly used due to their properties, there remains a demand for the use of molded cellulose for containers. There are various reasons for the popularity of cellulose for containers, notably the use of natural fibers for such containers, the compostable nature of some of these cellulose containers, the possibility of using recycled fibers, the cost-effectiveness, and the sustainability, to name a few advantages. However, such containers may not have the esthetic features of plastics and may therefore may be disadvantaged as product sellers may tend to favor plastics over cellulose containers, notably from a marketing perspective.

It would therefore be desirable to improve manufacturing techniques so as to enhance the esthetic features of cellulose containers.

SUMMARY

In one aspect, there is provided a container or lid comprising: a body of molded cellulose, the body of molded cellulose defining at least one wall, the wall having an outer surface and an inner surface a depression in the outer surface of the at least one wall; and at least one label, the at least one label being embedded in the depression in the outer surface of the at least one wall.

Further in accordance with the aspect, for example, a continuous edgeless surface is formed at a junction between the at least one label and the outer surface.

Still further in accordance with the aspect, for example, a surface portion of the container or lid is seamless at the junction between the at least one label and the outer surface.

Still further in accordance with the aspect, for example, a volumetric geometry of the depression corresponds substantially to that of the at least one label.

Still further in accordance with the aspect, for example, any portion of a peripheral edge of the at least one label projects out of the depression by a distance that is less than a thickness of the label.

Still further in accordance with the aspect, for example, the body of molded cellulose is a monoblock body of cellulose.

Still further in accordance with the aspect, for example, the at least one label has a paper substrate.

Still further in accordance with the aspect, for example, the at least one label has a dry liquid-activated adhesive on a face thereof applied against the body of molded cellulose.

Still further in accordance with the aspect, for example, the dry liquid-activated adhesive is dextrin.

Still further in accordance with the aspect, for example, the at least one label is adhesive-less on a face thereof applied against the body of molded cellulose.

Still further in accordance with the aspect, for example, a starch content of the molded cellulose secures the at least one label to the body.

Still further in accordance with the aspect, for example, the at least one wall has a thickness of 0.5 mm to 0.9 mm inclusively.

Still further in accordance with the aspect, for example, the body defines an inner cavity.

Still further in accordance with the aspect, for example, a surface of the inner cavity has a coating thereon.

Still further in accordance with the aspect, for example, the coating is a waterproofing coating.

In accordance with another aspect of the present disclosure, there is provided a method for labelling a container or lid having a cellulose body comprising: positioning at least one label against a surface of a mold; inserting cellulose into the mold such that the at least one label is sandwiched between the cellulose and the surface of the mold; pressuring, heating and extracting water from the cellulose in the mold, whereby the cellulose is thermoformed with the at least one label embedded on a surface of the thermoformed cellulose; and removing the thermoformed cellulose from the mold, the thermoformed cellulose being a container or a lid.

Further in accordance with the other aspect, for example, inserting cellulose into the mold includes inserting a mat of cellulose.

Still further in accordance with the other aspect, for example, pressuring, heating and extracting water from the cellulose in the mold causes a wall thickness reduction between 3 to 4 times from the mat of cellulose to the thermoformed cellulose, for at least one wall thereof.

Still further in accordance with the other aspect, for example, positioning at least one label against a surface of a mold includes positioning the at least one label such that a surface of the at least one label having a dry liquid-activated adhesive faces the cellulose.

Still further in accordance with the other aspect, for example, another step may include adding a coating to at least one surface of the thermoformed cellulose after removal from the mold.

DESCRIPTION OF THE DRAWINGS

Reference is now made to the accompanying figures in which.

DETAILED DESCRIPTION

Figure 1:
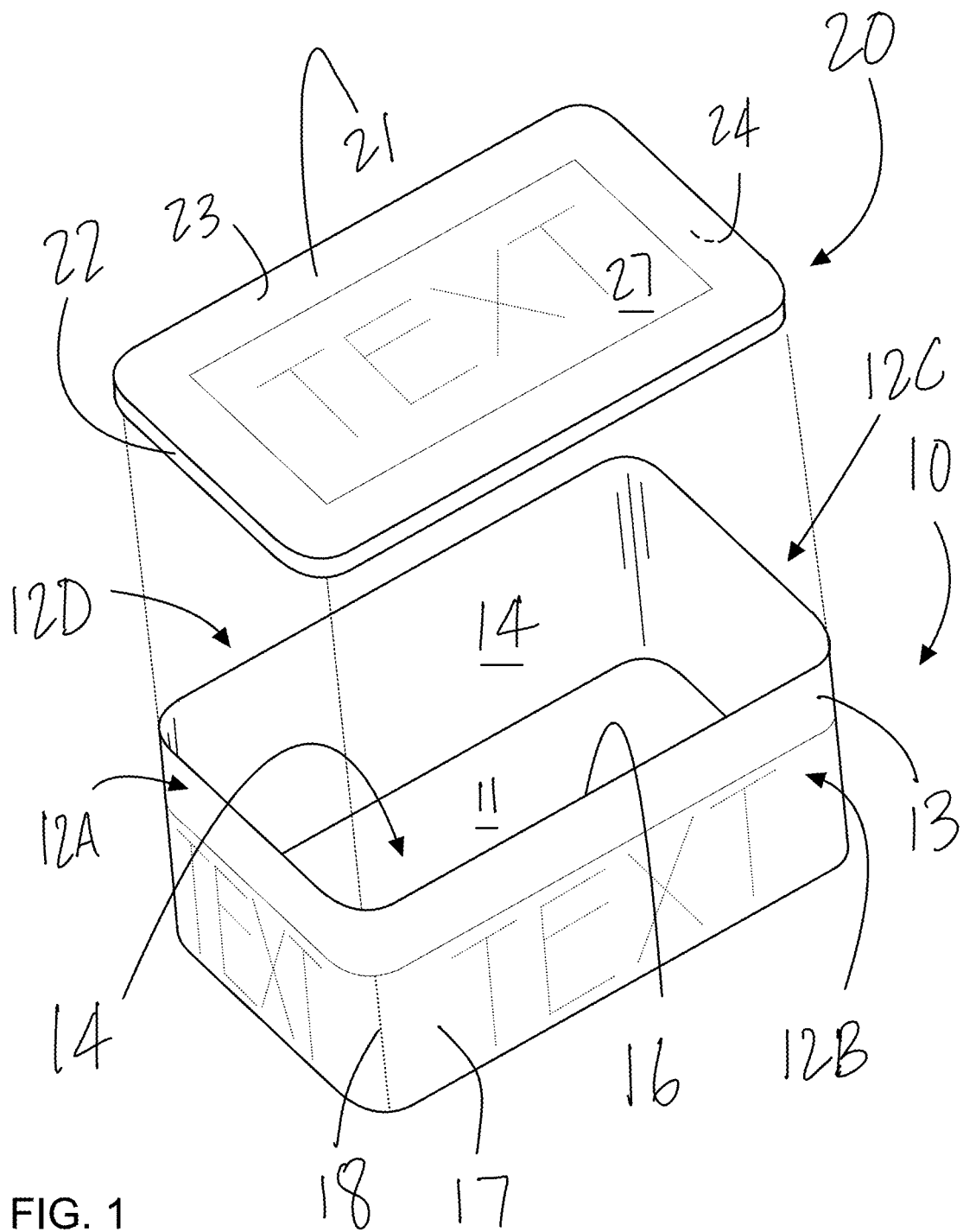
FIG. 1 is a perspective view of a cellulose container and lid with inner-mold label in accordance with the present disclosure.

Referring to the drawings and more particularly to FIG. 1, a cellulose container in accordance with the present disclosure is generally shown at 10. The container 10 may be referred to as a receptacle, a cup, a pot, a package, among other possible names. Moreover, while a container is shown, other objects may be made of labelled cellulose in accordance with the present disclosure, such as cups, trays, bowls, among examples. As shown in FIG. 1, the container 10 may be used with a lid 20 that may be releasably secured to a top of the container 10 to close a top opened end of the container 10. The lid 20 may or may not be made of cellulose, but in the illustrated embodiment, it is. Likewise, the container 10 may not be made of cellulose, while the lid 20 is. Stated differently, the present disclosure pertains to a container 10 made of cellulose, and/or a lid 20 made of cellulose. The container 10 may be used for packaging various items, whether in liquid, solid, gel, viscous forms, or as loose material or matter, granules, etc. The lid 20 may be used to close the open top of a container, such as the container 10.

The container 10 has cellulose as a main material. The cellulose is said to be the main material in that it makes up the greatest proportion by weight and/or by volume of the empty container 10. The cellulose may also be said to form the structure of the container 10, in that the shape of the container 10 is provided and maintained by the cellulose. Cellulose may also be known as moulded (molded) pulp, fiber (fibre), thermoformed fiber (fibre). These expressions may be used interchangeably herein. The cellulose may have any appropriate natural fibers (biomass) such as wood fibers, plant fibers, straw, cereals, annual plants, etc. The moulded cellulose may be made from recycled paper and water, cardboard, virgin cellulose. Additives can be added to the pulp to give desired characteristics to the cellulose. The given characteristics may include colour, moisture resistance, and/or enhanced shock resistance.

The container 10 shown in FIG. 1 has a generally rectangular prism shape with top opened end (e.g., slight upward flaring for mold ejection), when seen from a top view, but any other appropriate shape may be used with other possible geometries. The shapes may include oblong (as shown), rectangular, square, polygonal, oval, circular, among possible peripheral shapes, with the possibility of shape transitions (e.g., from a rectangular base to an oval rim). Geometries may include prisms, cylinders, hemispheres, truncated hemispheres, boxes, combinations thereof, among possible geometries. The container 10 may not be limited to any particular shape.

Reference will now be made to the container 10 when laid on a horizontal surface and thus with its open top end. In such an orientation, the container 10 may be said to have a bottom wall 11 with side walls 12 projecting generally upwardly (e.g., perpendicular to the bottom wall 11, or at other angles relative to the bottom wall 11). There are four different side walls 12 shown based on the exemplary geometry, namely side walls 12A, 12B, 12C and 12D. The side walls are referred to concurrently as 12 in the description but are shown as 12A-12D in the figures. Although sharp edges are shown between the bottom wall 11 and the side walls 12, a continuous geometry may be used to avoid the presence of sharp edges. For example, a bowl-shaped hemisphere may not have such sharp edges. Likewise, the side walls 12A to 12D may be said to be distinct from one another as each forms a side of the container 10, but the container 10 may be construed as having a single side wall 12 forming a closed figure with itself, for instance when the container 10 has a cylindrical shape, or corner regions may be arcuate so as to optionally have an inner surface and/or an outer surface without apparent edges. For simplicity, reference is made to the container 10 as having side walls 12, but the present disclosure also covers a single side wall 12 as described above.

The bottom wall 11 and the side walls 12 are part of a body of molded cellulose. The body may be said to be monoblock in that the bottom wall 11 and the side walls 12 are integrally molded together as one piece (though the walls 11 may have labels as described herein). The bottom wall 11 and side walls 12 concurrently define an outer exposed surface 13 of the container 10. More specifically, when the container 10 has the lid 20 thereon, the part of the container 10 that is seen is the outer exposed surface 13. The bottom wall 11 and side walls 12 also concurrently define an inner surface 14 that may also be referred to as inner surfaces 14. As detailed below, the inner surface 14 may not necessarily be of cellulose as it is contemplated to provide some surface coatings to provide given characteristics to the container 10, such as waterproofness or airtightness. The surface coatings may be added after molding, for example.

The combination of the bottom wall 11 and the side walls 12 define a concavity 15. The concavity 15 may be referred to as the inner cavity 15 of the container 10. It is the inner cavity 15 that acts as a receptacle for receiving material in the container 10. The volume of the inner cavity 14 may depend on the contemplated use. While the inner cavity 15 is shown as defined by the continuous, smooth surfaces of the bottom wall 11 and side walls 12, it is considered to provide the container 10 with various surface features, to define compartments, supports. For example, if the container 10 is used as an egg box, there may be a half dozen or a dozen interior support features to hold up the eggs separately.

A rim 16 defines the top open end of the container 10 and is at a junction between the outer exposed surface 13 and the inner surface 14. The rim 16 is shown as being a single continuous linear edge that may lie in a flat plane. However, it is considered to have features such as flanges, catches, ledges, wedges, holes, bosses, channels, to form part of connection features to releasably secure the lid 20 to the container 10, for instance by complementary connection features on the lid 20. In a variant, the rim 16 may define a flange or like surface for a sealing operculum (e.g., plastic film) to be sealingly secured to the container 10.

One or more inner-mold labels 17 is provided on the outer exposed surface 13. The inner-mold label(s) 17 is provided to identify the product in the container 10, for example, and may have information such as a brand, drawings, logos, pictures, names, volume data, nutritional data, service information, barcode, QR code, to name but a few of the types of data that may be on the label(s) 17. The label(s) 17 may have a paper substrate or facestock, upon which data is printed, drawn, etc. Additional layers may be provided on the label(s) 17, though the surface of the label(s) 17 interfaced to the cellulose of the container 10 is fiber-based, such as paper. The label 17 may also be made of a polymer substrate. However, the use of a fiber-based material for the label 17 may facilitate disposal of the container 10 with label 17, such as through composting or recycling.

As shown in FIG. 1, a single inner-mold label 17 covers side walls 12A and 12B. It is also considered to have that single inner-mold label 17 cover the side walls 12C and 12D and/or the bottom wall 11 as well, with the single inner-mold label 17 folded at the intersection between walls 11 and 12, if necessary. Moreover, the inner-mold label 17, as a single sheet of paper, may be die cut into a given shape, to be folded and/or formed to the shape of the container 10. As a result, a seam 18 may be present in the inner-mold label 17.

Other inner-mold label configurations are considered, such as having discrete labels 17 on separate faces of the container 10. The label(s) 17 is said to be an inner-mold label as it is in the mold during the molding process by which the container 10 is formed, so as to be integrally part of the container 10. Other expressions may be used to describe the inner-mold label 10 as in-mold label, integrated label, monoblock labelling, IML. The inner-mold label molding process will be described hereinafter with reference to FIGS. 3A to 3C.

Still referring to FIG. 1, the lid 20 is shown as being generally flat. The lid 20 may have a cover wall 21 that is shaped to be laid onto the container 10 so as to close the open top end of the container 10. Consequently, the cover wall 21 may be said to be planar or flat, but may have other geometries as well (e.g., three dimensional shapes, such as a dome, as alternatives to the being flat. Likewise, the contour of the cover wall 21 generally matches the shape of the open top end of the container 10, but may have other shapes based on the shape of the container 10.

According to an embodiment, the lid 20 has a skirt 22 by which it attaches to the rim 16 of the container 10. The skirt 22 may also be referred to as a peripheral wall, as a catch, as a ledge, and may use any appropriate connection technology for the releasable complementary connection to the container 10. The lid 20 has an outer exposed surface 23 that may also be referred to as a main surface of the lid 20 and that is seen when the container 10 is closed with the lid 20. The outer exposed surface 23 is generally flat but may have surface features, for instance to enable the stacking of filled containers with lids 20 thereon, such as ribs, shoulders, etc. The inner surface 24 is on an opposite surface of the outer exposed surface 23. The inner surface 24 typically faces the inner cavity 15. The inner surface 24 may have a surface coating that may be equivalent to the surface coating that is on the inner surface 14 of the container 10. In similar fashion to the container 10, an inner-mold label 27 may be provided on the outer exposed surface 23 of the lid 20, though optionally. The expression "inner-mold" is used for label 27 for the same reason as the inner-mold label 17 of the container 10. However, in an embodiment, it is considered to have inner-mold technology for either the container 10 or the lid 20, i.e., not both. The lid 20 may also be made of a material other than molded cellulose.

Figure 2:
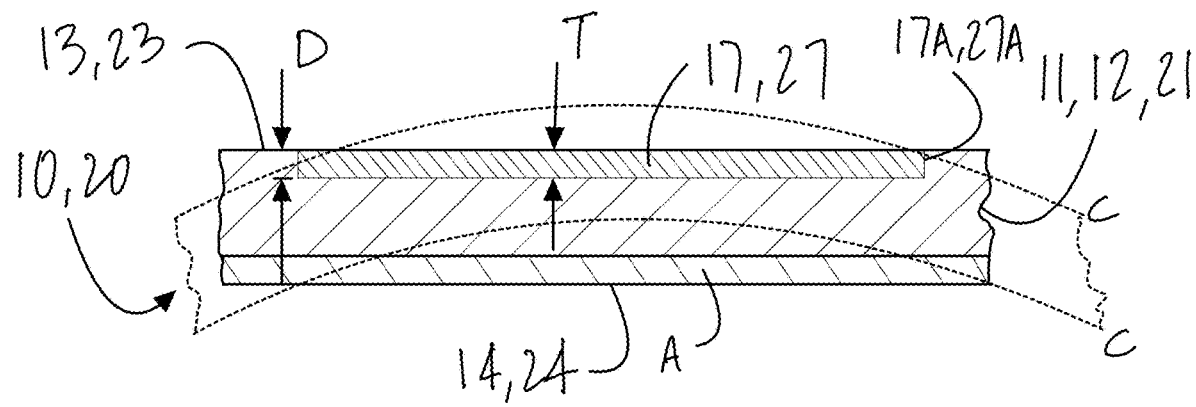
FIG. 2 is a cross-sectional schematic view of a wall of the cellulose container and lid of FIG. 1, in accordance with a variant of the present disclosure.

Referring now to FIG. 2, a schematic cross-section of a wall 11, 12, and/or 21 of the container 10 and/or lid 20 is shown to exhibit the configuration of the inner-mold label 17/27 relative to the cellulose material of the walls 11, 12 and/or 21. Stated differently, the configuration shown in FIG. 2, may be for any one or more of the wall 11, 12, and/or 21. FIG. 2 is schematic, to illustrate a depression in the cellulose material in which the label 17/27 is received, in spite of the fact that the label 17/27 is paper-thin (though not necessarily in paper), whereby magnifying optical devices may be required to observe such penetration in the depression. On the contrary, the thickness of the wall 11, 12 and/or 21 may be proportionally shown as thinner than it actually is relative to the label 17/27.

The walls 11, 12 and/or 21 are illustrated as being made of a single layer of cellulosic material, but more than one layer may be present. For example, an outer layer and/or a central layer, defining the outer exposed surface 13/23, may be made of recycled fibers, while an inner layer, i.e., that may be in touch with foodstuff depending on use, may be made of virgin fibers. As another example, an outer layer may include a first color and the inner layer may include a second color. As yet another example, the layers may have different fiber orientations, to strengthen the end container.

The outer exposed surface 13/23 is shown and it is observed that the inner-mold label 17/27 form an edgeless continuous surface with the outer exposed surface 13/23. The expression edgeless may be defined as meaning that there is no substantially projecting portion of label or cellulose at the junction between surface 13/23 and label 17/27—edges may be present where the labels 17/27 are folded on themselves, such as at seam 18. Stated differently, the junction between the cellulose matter of the surfaces 13/23 is seamless with the upper surface of the material of the labels 17/27. In a variant, the surface coefficient of friction may vary between the outer exposed surface 13/23 with molded cellulose and the surface 17/27, in spite of the seamless junction. The labels 17/27 are lodged or embedded in a depression formed into the cellulose material of the walls 11/12/21, by the equivalent of a thickness T of the labels 17/27. For example, the labels 17/27 have a thickness between 0.05 mm and 0.15 mm. The depression has a depth D that may be equal to the thickness T. The depression may be said to have a volumetric shape corresponding to that of the label 17/27. A peripheral edge of the labels, shown as 17A/27A, is therefore in face-to-face contact with the cellulose material of the walls 11/12/21. In an embodiment, the peripheral edge 17A/27A of the label 17/27 may not be fully surrounded by the cellulose material, but any portion of the peripheral edge 17A/27A not fully in the depression is out by a distance that is less than thickness T. Hence, seamless may be said to define the absence of a step between the label 17/27 and the cellulose matter of the surfaces 13/23 surrounding immediately the label 17/27. It may be said that any step, if present, may have a value that is less than the thickness T, as some form of embedding of the label 17/27 into the surface 13/23 may always be present. Stated differently, there is always some penetration of the label 17/27 into the surface 13/23, such that the surface 13/23 as in inward step at a location of junction with a periphery of the label 17/27. The penetration may be all around the periphery of the label 17/27. It may be said that a wall of the depression is face to face with an edge surface of the periphery of the label 10.

In an embodiment, no added adhesive is between the labels 17/27 (e.g., they are adhesive-less) and the cellulose of the walls 11, 12, 21, but starch that is an integral part of the pulp in the molding process may contribute to the adhesion of the paper substrate of the label 17/27 to the cellulose of the walls 11/12/21. In another embodiment, a thin layer or spots of a dry liquid-activated adhesive (moist-enable adhesive) is provided on the surface of the label 17/27 that adheres to the walls 11/12/21. A dry liquid-activated adhesive may be said to have limited tackiness when dry, but with the tackiness increasing substantially once the adhesive is moistened. The liquid-activated adhesive may for instance be a dextrin (e.g., vegetable starch). In another embodiment, the pulp sludge may incorporate an adhesive additive.

Still referring to FIG. 2, a coating A is shown as covering the inner surface 14/24 of the container 10/lid 20. The coating A may be applied after the molding of the container 10 or lid 20. The coating A may be any appropriate type of coating to provide some characteristics to the container 10 or lid 20, as described above. For example, the coating A may be a wax, a polymer, a metal (e.g., aluminum foil), and as a result properties such as airtightness, waterproofness, may be given to the container 10/lid 20. Additional coating layers may be provided, for instance on top of the coating A, or on the outer exposed surface 13/23. Likewise, inner-mold labels 17/27 may be on the inner surfaces 14/24.

While the walls 11, 12 and 21 are shown as being flat in FIG. 2, they may also be curved, such as shown by curve lines C. Stated differently, curve lines C represent a contemplated shape of the wall 11, 12 and/or 21 where the labels 17/27 are embedded. The curvature may be cylindrical, spherical, etc. In spite of the presence of curvature, the labels 17/27 still form a generally edgeless continuous surface with the surrounding exposed surface 13/23. FIG. 2 may not be to scale. The labels 17/27 and the coating A are shown thicker than they may actually be, for the clarity of the figures.

Figure 3A:
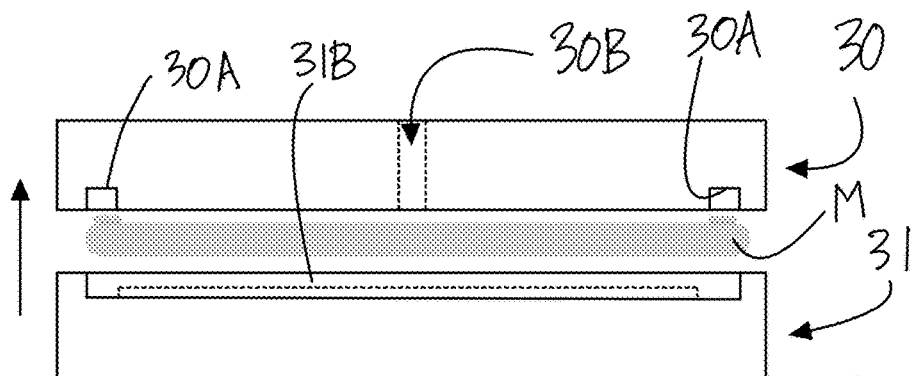
FIGS. 3A to 3C show a sequence of molding the cellulose container or lid with inner-mold label of FIG. 1.
Figure 3B:
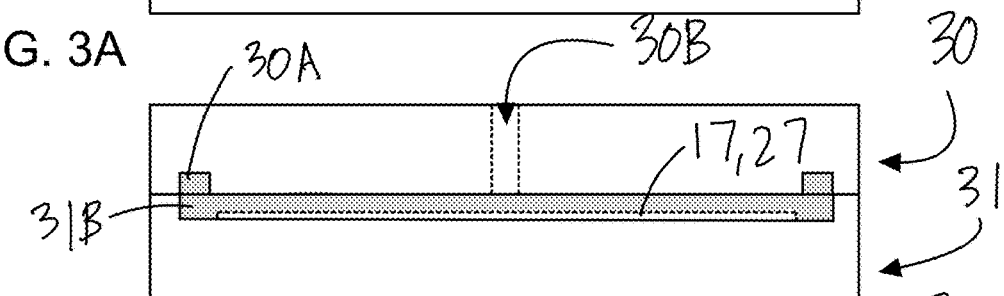
Figure 3C:
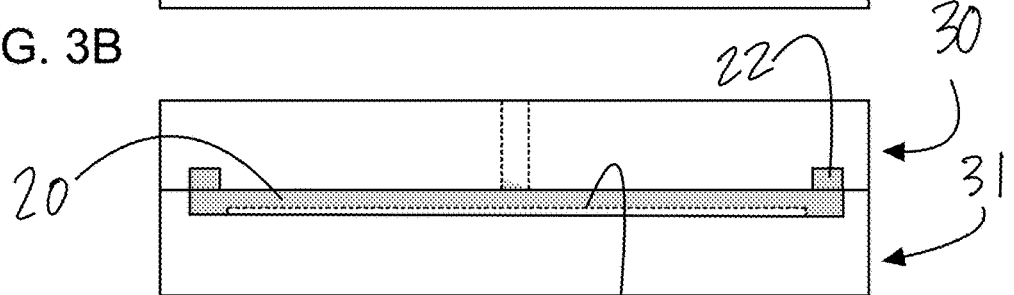

Referring to FIGS. 3A to 3C, a cellulose molding process is described, by which the container 10 and/or lid 20 may be fabricated with the inner-mold labels 17/27 integrated therewith, in the edgeless continuous surfaces. For simplicity, the mold is shown as having a first mold part 30 and a second mold part 31 concurrently forming a single cavity for molding a single part (herein shown, the lid 20). Other mold parts (also known as slides) and/or more than one cavity per mold may be provided as well.

The mold shown in FIGS. 3A to 3C is for molding the lid 20 with the inner-mold label 27. However, a similar molding approach may be used to fabricate the container 10. The first mold part 30 has cavity portions 30A that may essentially be an annular channel to form the skirt 22. Optionally, one or more injection port(s) 30B may be present, through which pulp may be injected in the mold cavity. The injection port(s) 30B may be optional, in that other molding techniques may be used, such as using a cellulose mat M, also shown in FIG. 3A. Other mold components may be present, such as vacuum holes, etc, to drain liquid from the cellulose pulp in the closed mold. It is also considered to provide inflatable bladders to exert a compressive action. For example, the mold parts 30 and 31 exert a pressure when closing, but in a direction of closure. Bladders may be present to exert a pressure in another direction, such as transverse to the mold closing direction. For molding the container 10, the wall(s) 12 may be oblique relative to the wall 11 for the mold parts 30 and 31 to exert the pressure to the walls 12 when closing in the manner shown in FIGS. 3A to 3B.

As shown in FIG. 3A, the first mold part 30 is separated from the second mold part 31. The second mold part 31 also has a cavity portion 30B in which the cover wall 21 is molded. When the first mold part 30 is pressed against the second mold part 31 in the manner shown in FIG. 3B, there results a cavity that has the geometry of the part to be molded, that is the geometry of the lid 20.

Prior to the closing of the mold parts 30 and 31 as in FIG. 3B, the label(s) 27 is inserted in the second mold part 31 (or the mold part 30) and is applied against a surface of the mold. The insertion may be done manually, by a robot, etc. Humidity on the surface of the mold, vacuum ports and/or mechanical abutments, may ensure that the label 27 remains in a desired position. In an embodiment, cellulose mat M is used. The cellulose mat M may be a preformed version of the lid 20 (or container 10), that may generally have the shape of the lid 20 (or container 10), though thicker. For example, the cellulose mat M may be an individual piece manipulated by robot, or may be fed by a roll. The cellulose mat M may be damp. As an example, the weight ratio of water to cellulose for the cellulose mat M may range from more than 1:1 (i.e., more water than fiber), to 1:2 (double the weight of fiber). Hence, the process of the present disclosure may include a step of molding the mat M prior to inserting same in the mold 30 at FIG. 3A.

Once the label 27 is in the mold, the first mold part 30 may be closed with the second mold part 31 with the label 27 and the cellulose mat M (if used) captured in the mold cavity. The label 27 is against the surface of the mold. The closing of the mold causes a compression of the cellulose mat M in the mold, such that water may be squeezed out to evacuate through ports in the surface of the mold M. The compression may cause a reduction in wall thickness, up to 3 or 4 times, if not more. For example, the walls 11, 12, 21 may have a thickness of 0.5 mm to 0.9 mm (inclusively), while the cellulose mat M may have had a thickness between 2.0 and 3.0 mm (if not more). There also results an increase in density in the process. Heating also occurs to contribute to the shaping of the fibers and to the evacuation of water from the cellulose and from the mold 30.

This may be part of a thermoforming process for molded cellulose and/or may be known as a "cure-in-the mold". The thermoforming process/cure-in-the-mold is well suited to use a multi-layer cellulose body, i.e., with the inner-mold label 27. The pulp may also include starch that contributes to the adhesion of the paper of the inner-mold label 27 to the cellulose. If the label 27 has a dry liquid-activated adhesive, the moisture in the pulp and the pressure in the mold 30 ensure that the label 27 bonds to the cellulose of the wall 21. As the combination of the inner-mold label 27 and cellulose of the lid 20 are dried, the inner-mold label 27 becomes an integral part of the lid 20, that defines the depression as a result of the label 27 being in the mold. There results a continuous edgeless surface in the manner shown in FIG. 2, and/or a connection that has the attributes described above with respect to FIGS. 1 and 2 (depression, seamless, etc). Once the container 10/lid 20 is ejected from the mold, a surface coating A may be applied. For example, a surface coating may be applied to the inner surfaces 14 and/or 24 to provide it(them) with properties, such as water-resistance or waterproofness. This is optional.

In an embodiment without mat, the pulp may be injected into the cavity formed by the first mold part 30 and the second mold part 31, such that the pulp fills the cavity, via the injection port(s) 30B. As the label 27 is against the surface of the mold there is little or no penetration of the cellulose between the mold surface and the exposed surface of the inner-mold label 27. The pulp surrounds and covers the label 27 when settling. The pulp that is injected has a high water content, but the water is extracted by vacuum/drain holes, by suction, and/or by heating of the mold. Additives may be in the pulp to provide properties to the pulp.

In an embodiment, the process shown in FIGS. 3A to 3C for molded pulp uses "cure-in-the-mold" technology, such that the container 10 or lid 20 with labels 17 and/or 27 are well defined, smooth-surfaced molded pulp products. After being formed, the container 10/lid 20 are captured in the heated mold in which the cellulose with label is pressed and densified. The container 10/lid 20 with labels 17/27 may therefore be ejected or removed from the mold in a finished state as opposed to being dried in an oven.

The container 10 and or lid 20 may be generally described as having a body of molded cellulose, the body of molded cellulose defining at least one wall, the wall having an outer surface and an inner surface, a depression in the outer surface of the at least one wall; and at least one label, the at least one label being embedded in the depression in the outer surface of the at least one wall.

The container 10 and or lid 20 may optionally be labelled according to a method that may be described as having steps such as positioning at least one label against a surface of a mold; inserting cellulose into the mold such that the at least one label is sandwiched between the cellulose and the surface of the mold; pressuring, heating and extracting water from the cellulose in the mold, whereby the cellulose is thermoformed with the at least one label embedded on a surface of the thermoformed cellulose; and removing the thermoformed cellulose from the mold, the thermoformed cellulose being a container or a lid. Other steps or substeps may include: inserting a mat of cellulose; causing a wall thickness reduction between 3 to 4 times from the mat of cellulose to the thermoformed cellulose, for at least one wall thereof; positioning the at least one label such that a surface of the at least one label having a dry liquid-activated adhesive faces the cellulose; and/or adding a coating to at least one surface of the thermoformed cellulose after removal from the mold.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A container or lid comprising:
   a body of molded cellulose, the body of molded cellulose defining
   at least one wall, the wall having an outer surface and an inner surface,
   a depression in the outer surface of the at least one wall; and
   at least one label, the at least one label being embedded in the depression in the outer surface of the at least one wall, a continuous edgeless surface is formed at a junction between the at least one label and the outer surface, the continuous edgeless surface extending to the outer surface surrounding the at least one label, and to the label.

2. The container or lid according to claim 1, wherein a continuous edgeless surface is formed at a junction between the at least one label and the outer surface.

3. The container or lid according to claim 1, wherein a surface portion of the container or lid is seamless at the junction between the at least one label and the outer surface.

4. The container or lid according to claim 1, wherein a volumetric geometry of the depression corresponds substantially to that of the at least one label.

5. The container or lid according to claim 1, wherein any portion of a peripheral edge of the at least one label projects out of the depression by a distance that is less than a thickness of the label.

6. The container or lid according to claim 1, wherein the body of molded cellulose is a monoblock body of cellulose.

7. The container or lid according to claim 1, wherein the at least one label has a paper substrate.

8. The container or lid according to claim 1, wherein the at least one label has a dry liquid-activated adhesive on a face thereof applied against the body of molded cellulose.

9. The container or lid according to claim 8, wherein the dry liquid-activated adhesive is dextrin.

10. The container or lid according to claim 1, wherein the at least one label is adhesive-less on a face thereof applied against the body of molded cellulose.

11. The container or lid according to claim 10, wherein a starch content of the molded cellulose secures the at least one label to the body.

12. The container or lid according to claim 1, wherein the at least one wall has a thickness of 0.5 mm to 0.9 mm inclusively.

13. The container or lid according to claim 1, wherein the body defines an inner cavity.

14. The container or lid according to claim 13, wherein a surface of the inner cavity has a coating thereon.

15. The container or lid according to claim 14, wherein the coating is a waterproofing coating.

16. The container or lid according to claim 1, wherein the container or lid with the at least one label is a smooth-surface molded pulp product.

17. The container or lid according to claim 1, wherein the continuous edgeless surface is for an entire periphery of the at least one label.

* * * * *